US006374229B1

(12) United States Patent
Lowrey et al.

(10) Patent No.: US 6,374,229 B1
(45) Date of Patent: Apr. 16, 2002

(54) INTEGRATED INTERNET FACILITATED BILLING, DATA PROCESSING AND COMMUNICATION SYSTEM

(75) Inventors: Susan Lowrey; Richard A. Krumholz, both of Sarasota, FL (US)

(73) Assignee: Billingnetwork.com, Inc., Sarasota, FL (US)

( * ) Notice: Subject to any disclaimer, the term of this patent is extended or adjusted under 35 U.S.C. 154(b) by 0 days.

(21) Appl. No.: 09/421,902

(22) Filed: Oct. 20, 1999

(51) Int. Cl.$^{7}$ .......................... G06F 17/60; G06F 15/16
(52) U.S. Cl. .......................................... 705/34; 709/219
(58) Field of Search ............................. 705/35, 27, 34; 709/219

(56) References Cited

U.S. PATENT DOCUMENTS 5,696,906 A 12/1997 Peters et al. ................ 395/234
5,715,397 A 2/1998 Ogawa et al. ......... 395/200.18
5,790,548 A 8/1998 Sistanizadeh et al. ....... 370/401
5,832,460 A 11/1998 Bednar et al. ................ 705/27
5,852,842 A * 12/1998 Reeder ........................ 705/34
5,884,284 A 3/1999 Peters et al. .................. 705/30
5,920,847 A 7/1999 Kolling et al. ................ 705/40
5,924,074 A 7/1999 Evans ........................... 705/3
6,023,684 A * 2/2000 Pearson ....................... 705/35
6,052,674 A * 4/2000 Zervides et al. .............. 705/34
6,092,055 A * 7/2000 Owens et al. ................. 705/34
6,223,213 B1 * 4/2001 Cleron et al. ............... 709/219

FOREIGN PATENT DOCUMENTS

EP 0 491 497 A1 * 6/1992 ............ H04Q/3/00

OTHER PUBLICATIONS

Traeden, Jason, "Standardize and upgrade mixed computing environment", Health Management Technology, vol. 20, No. 10, Nov. 1999, pp. 24–26.*

Communications News, Mar. 1999, vol. 36, issue 3, p. 48.*

Citrix Customer Profiles: Wyland Galleries Hawaii, pp. 1–3, date unknown.*

Citrix Press Release: HealthPoint Licenses Citrix WinFrame Thin–Client/Server Software, Jun. 30, 1997, pp. 1–3.*

* cited by examiner

*Primary Examiner*—Robert P. Olszewski
*Assistant Examiner*—Bryan Jaketic
(74) *Attorney, Agent, or Firm*—Charles J. Prescott

(57) ABSTRACT

A database server and a Citrix®-type direct access server electronically interconnected between said database server and a plurality of subscribers, each of which gain secure access into a server via a modem and an internet service provider (ISP). Thin client access provides for electronic transfer of billing and data entry to each direct access subscriber upon request. Browser based subscribers use forms processing to transfer data into the database server which utilizes an appropriate application software therein to produce billing invoices and statements to clients and customers of each corresponding subscriber. Thin client access also provides real time electronic viewing and query access regarding data and billings stored in the database server by each corresponding direct access subscriber. A home page of a website of the system provides access via an ISP to the database server by a plurality of browser-based subscribers. The home page provides secure access by each browser-based subscriber to each of a plurality of subscriber areas within the system. The database server includes open database compliant software (ODBC) for seamless integration with other software applications. Data entered on the forms is then sent electronically to be entered into said database server to produce billing invoices and statements from applications software to clients and customers of each corresponding browser-based subscriber.

7 Claims, 4 Drawing Sheets

DIRECT ACCESS SUBSCRIBER SYSTEM

COMBINATION SYSTEM FOR BROWSER-BASED AND DIRECT ACCESS SUBSCRIBERS

INTEGRATED INTERNET FACILITATED BILLING, DATA PROCESSING AND COMMUNICATION SYSTEM

BACKGROUND OF THE INVENTION

1. Scope of Invention

This invention relates generally to electronic billing systems, and more particularly to an integrated internet based or facilitated system for billing, data processing and communication.

2. Prior Art

The traditional approach to billing for services rendered includes the requirement that the business purchase hardware and software as well as trained personnel to perform the billing function. The obvious advantage of this approach is total control over the data and its security. Drawbacks inherent in this approach, however, include a substantial equipment and set-up cost and on-going system maintenance and salary for personnel with sufficient expertise to operate and manage such a traditional system.

The next major developmental step in accomplishing this function has been to outsource such billing and accounting activity. This approach has gained in popularity as it avoids the need for expensive hardware, software and personnel costs. However, the loss of control of the data and the inability to have real time access thereto has led to sluggish entry, billing and reporting of data.

One patented system invented by Evans and disclosed in U.S. Pat. No. 5,924,074 discloses an electronic medical records system involving a point of care system and a patient data repository which is primarily directed to the processing and analysis of patient care data and other additional functions related to data access and its manipulation for diagnosis purposes.

The following additional recent computer software-related inventions are known to applicants:

U.S. Pat. No. 5,696,906 to Peters et al.

U.S. Pat. No. 5,715,397 to Ogawa et al.

U.S. Pat. No. 5,790,548 to Sistanizadeh et al.

U S. Pat. No. 5,832,460 to Bednar et al.

U.S. Pat. No. 5,884,284 to Peters, et al.

U.S. Pat. No. 5,920,847 to Kolling et al.

However, none of this known prior art brings together the best of the traditional approaches while taking advantage of current advances in computer software and hardware technologies. The present invention avoids the need to purchase expensive equipment or to maintain personnel or infrastructure for billing of services while providing real time access to stored data via an internet service provider (ISP). By utilizing thin client technology for direct access subscribers, encryption, authentication, fire walls and other security measures, as well as open based compliant (ODBC) databases allowing browser-based subscribers seamless integration with other server applications of the system, substantial gains and improvements unobvious or untaught in prior art are available to subscribers.

A number of recently available technologies in the computer software and internet arena have contributed to making the present invention a reality. One such advance is known as "thin client technology" or the use of narrow band width for transferring data via phone modem lines. Wide band widths made data transfer very slow in comparison to thin client transfers. In thin client technology which will be used by direct access subscribers, the software applications are installed and run on the database server and computer activity, installations and upgrades which are controlled from a central point. All that is transferred to the subscriber's computer is a screen which responds to their input at the remote location. This is sometimes referred to as a "screen picture".

Another important internet-related technology is the "Citrix®" system which allows a network subscriber on Windows or non-Windows machines to run Windows applications on a database server. The actual applications are executed on the server, the subscriber's machines merely acting as terminals used only for entering subscriber input and displaying application output. The Citrix® systems thus facilitate the thin client technology.

Another related internet-based improvement utilized by the present invention is that of "seamless" integrations wherein a remote subscriber can link via modem and an ISP from a remote computer and still have access to the speed and power of the database server. The remote computer does not need to be state-of-the-art, as it serves only as a terminal. The remote computer can range from a 386/486 PC to a current state-of-the-art PC and/or may use non-Windows operating systems such as DOS®, Macintosh® or UNIX®. The present invention is particularly adapted to browser-based computer subscribers which are facilitated in this regard by open database compliant software (ODBC) which facilitates the seamless integration with other applications to expand the processing and analysis function of the present invention. Normally, subscribers using Windows based computers have traditionally performed poorly over wide area networks (WAN). This poor performance may be attributed to the way the programs are written so as to take full advantage of upper memory areas and fast processors. When using these programs on a network, each new direction from keyboard or mouse results in all those files necessary to perform that function being transferred across the network. The end result is very slow response unless the programs reside on the local computers as well as on the database servers at substantial additional expense. With the invention, no new software is required to be installed, no new hardware is required to be purchased and connection is made at normal modem speed.

All of these technologies incorporated into the invention are interrelated to facilitate access to high powered database servers and software and applications contained thereon without the need for the expense of computer replacement, additional employees or new software at the remote site.

BRIEF SUMMARY OF THE INVENTION

This invention is directed to a database server and/or a Citrix®-type direct access server electronically interconnected between said database server and a plurality of subscribers. A home page of a website of the system provides access to the servers by a plurality of subscribers. The home page provides secure access by each subscriber to each of a plurality of subscriber areas within the system. Subscribers will access the database through the internet via either thin client technology and the Citrix® server or via browser-based forms processing. Both methods will access the database server. Data entered via forms processing is transferred into the database server which utilizes appropriate application software therein to produce billing invoices and statements to clients and customers of each corresponding browser-based subscriber. The proprietary database will then produce billing invoices and statements to clients of each corresponding browser-based subscriber.

It is therefore an object of this invention to provide an integrated internet facilitated billing, data processing and communications system for browser-based computer subscribers without the need for them to purchase additional software and equipment expense.

It is another object of this invention to provide an integrated internet facilitated billing, data processing and communications system for direct access subscribers who may not necessarily need to have state-of-the-art PC type computers. Thin client access provides for transfer of billing information in real time between the subscriber and the servers. The subscriber will have instantaneous access to the data and enter data directly into secure subscriber data sets.

It is still another object of this invention to replace the traditional approaches to billing for services rendered without the need for the purchase of expensive state-of-the-art computer software and the hiring of trained personnel.

It is still another object of this invention to utilize recent advances in software and internet related technology in the areas of thin client technology, open database compliant software (ODBC) and seamless integration, and Citrix® technology.

In accordance with these and other objects which will become apparent hereinafter, the instant invention will now be described with reference to the accompanying drawings.

DETAILED DESCRIPTION OF THE INVENTION

Figure 1:
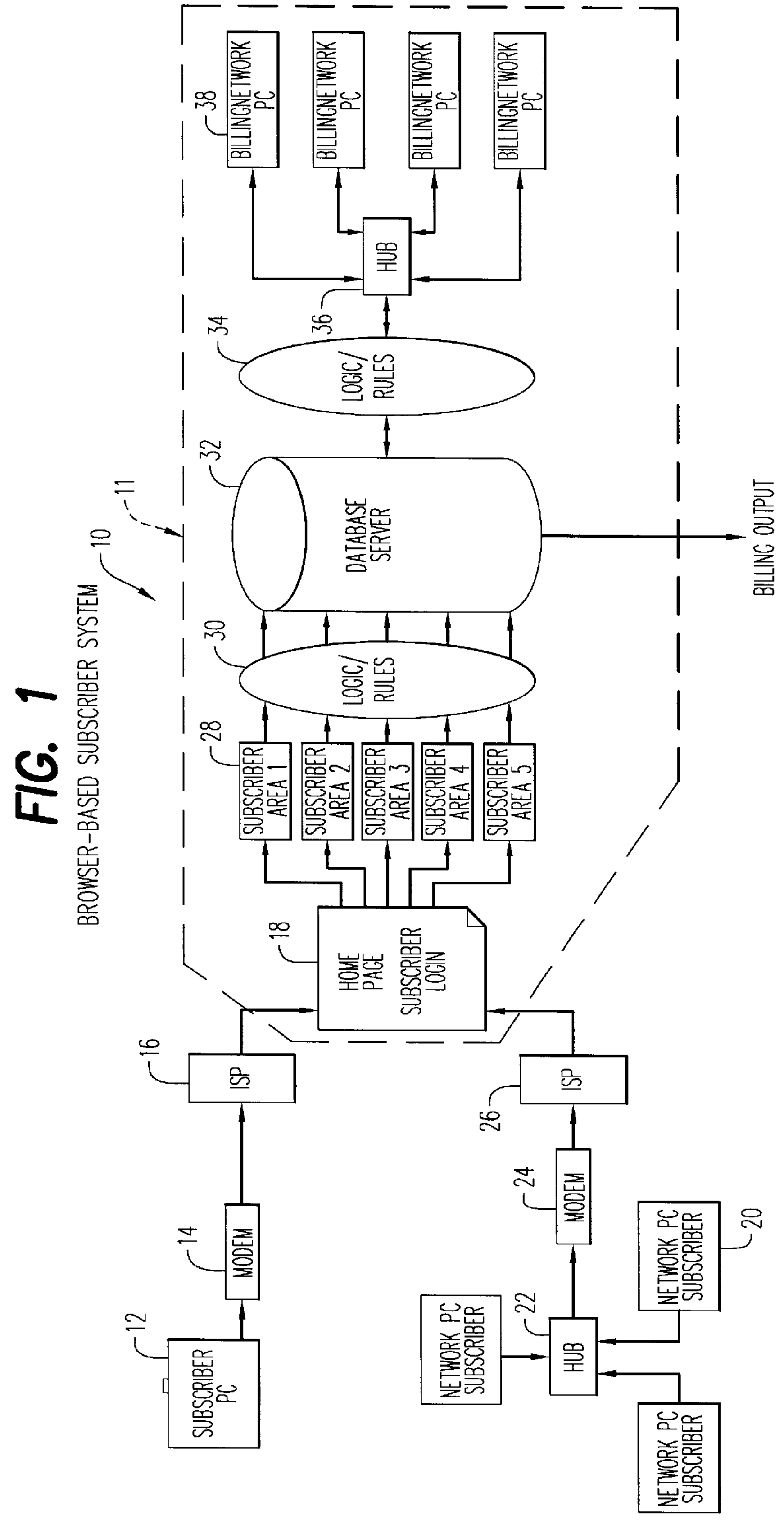
FIG. 1 is a block diagram illustrating the internet facilitated billing, data processing and communications system with respect to browser-based subscribers.

Referring now to the drawings, one embodiment of the invention is shown generally at numeral 10 in FIG. 1 and is directed to browser-based subscribers 12 or 22. Browser-based subscriber 12 utilizes a single PC-type computer which operates on Windows software. This browser-based subscriber 12 gains access to the system 11 via modem 14 and an internet service provider (ISP) 16. A local network of browser-based subscribers 20 connected to a hub 22 may also gain access to this system 11 via a modem 24 and ISP 26.

Each of the subscribers 12 and 20 enter the system 11 via a home page 18 of a website of the system 11. A unique subscriber log-in and password provides a secure access to a subscriber area 28 which then provides access to data forms (not shown) of a software application which are transferred to, and appear on the screen of each remote subscribers PC.

Forms are completed and transferred from the corresponding subscriber area 28 for forwarding into a database server 32 which is of the open database compliant type (ODBC). The input forms are transferred into the database server subject to certain business logic and rules at 30. This is a software based function which insures that each subscriber's database is altered in accordance with rules set forth in this software function at 30.

Thus, the forms transferred to each subscribers PC screen provide a framework for data entry of essential data such as the person or company being billed, where the bill is to be sent and charges for services rendered. These forms include drop-down lists for selection of frequently used information as well as built-in rules or logic associated with the software function at 30.

The forms also establish query links to the database server 32. Query forms (not shown) are also available for transmission to the remote PC screen of each browser-based subscriber 12 and 20. These query forms provide each subscriber with access to the database server 32 which, in combination with drop-down lists, select the desired account for access to the database of the data server 32 to retrieve the requested information to the screen of the remote PC. Input and query forms are developed within the system 11 by billing network PC work stations 38 which are connected at hub 36, all forms and information input being subject to business rules and logic at 34 before entered into the database server 32. Again, as described in the Background, the ODBC database providing seamless integration with the software applications contained on the database server 32 greatly facilitates the speed and reporting and analysis functions of the system for browser-based subscribers. The data and query forms are transferred without the need for having the underlying software applications on the subscriber computer hard drive which greatly facilitates both speed and conveyance.

Figure 2:
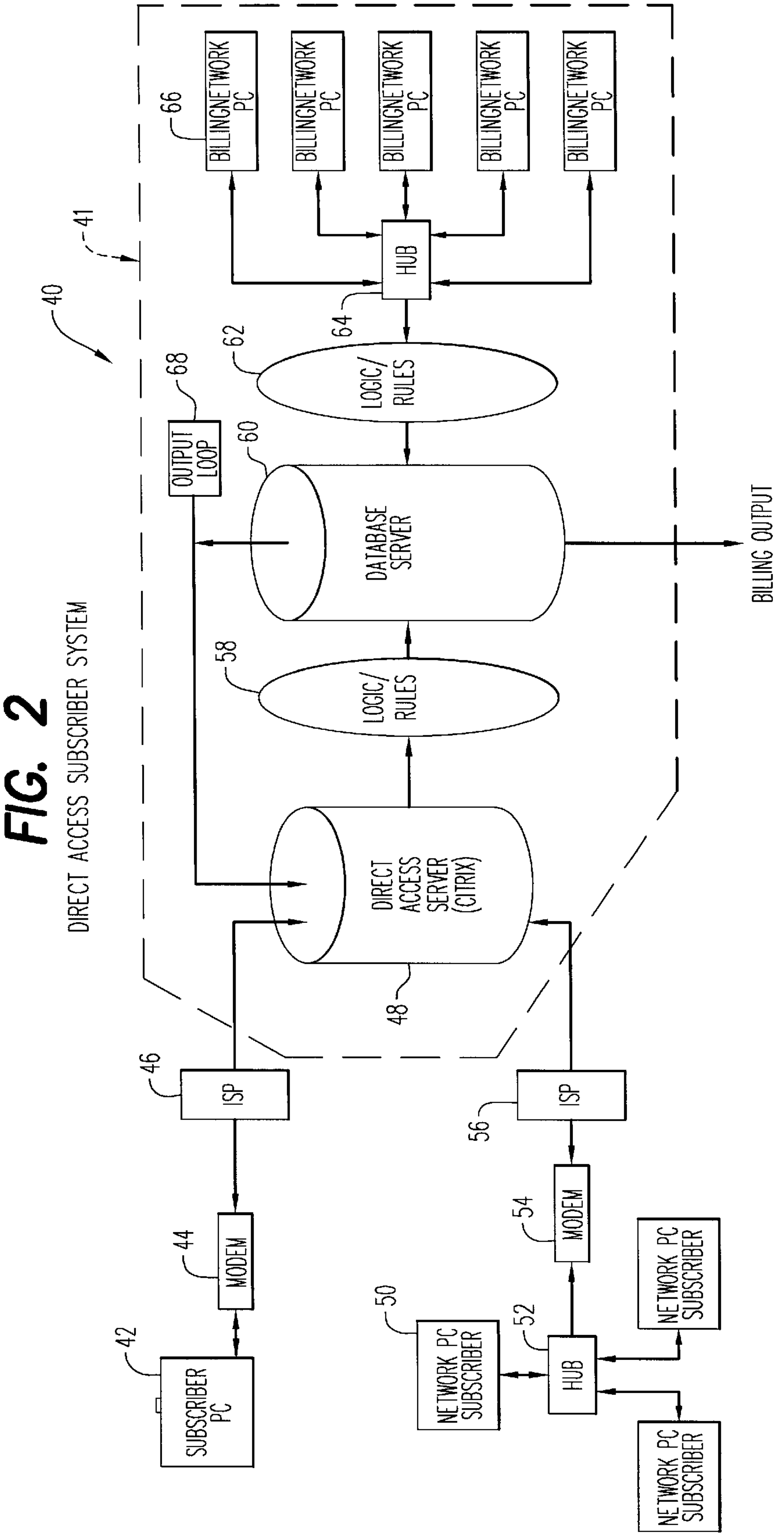
FIG. 2 is a block diagram similar to FIG. 1 with respect to direct access subscribers.

Referring to FIG. 2, an adaptation of the present invention is shown generally at numeral 40 for direct access subscribers individually at 42 or in a local PC network 50 via hub 52. By interconnecting these direct access subscribers 42 and 50 via an internet service provider (ISP) 46 or 56, respectively, to a direct access server 48 known in the industry as a "Citrix®"-type server as previously described, even those subscribers with non state-of-the-art computer terminals and non-Windows based operating systems such as Macintosh®, DOS® and UNIX®, are able to take advantage of high-speed database update and query. This is due to the Citrix® system facilitating "thin client" technology as previously described wherein only a screen picture or form is transferred between the subscriber terminal 42 and 50 and there corresponding data held on the database server 60. The bulk of the data processing occurs on the database server 60 so that the subscriber terminals 42 and 50 need not even have hard drive or large capacity data storage of their own.

All forms and query inputs received by the direct access server 48 must be first qualified by business logic and rules software at 58 prior to being entered into and processed within the database server 60. Likewise, all of the internal computer terminals 66 which are joined together at hub 64 are subject to the same business logic and rules at 62 prior to data entry and forms manipulation and development from this source into the database server 60.

An output loop 68 provides fully interactive access between the subscribers 42 and 50 and their particular data stored within the database server 60. Input and output to and from the database server 60 flows through the direct access server 48 which, again, facilitates transfer of data transferred to the subscribers 42 and 50 and then, when completed, transferred back into the database server 60 after business logic and rules qualification at 58. The external function of this system 40, again, is in the form of billing output from the database server to service clients or customers of the subscribers 42 and 50.

Figure 3:
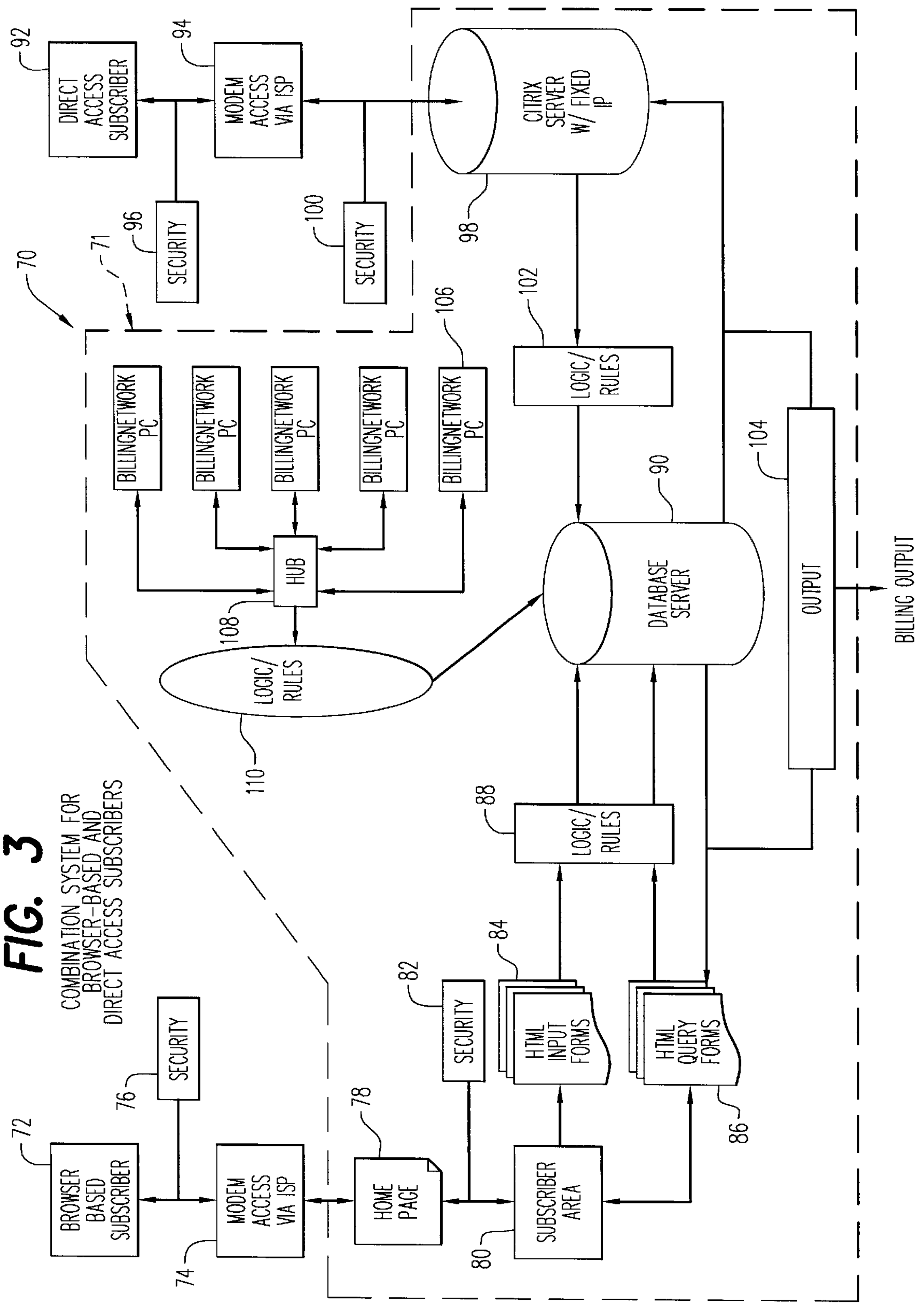
FIG. 3 is a flow chart illustrating the process flow of internet based billing, data processing and communication system with respect to both browser-based and direct access subscribers.

Referring now to FIG. 3, a block diagram flow chart of the preferred embodiment of the invention is shown generally at numeral 70 and incorporates both browser-based subscribers 72 and direct access subscriber 92 generally as previously described. All subscribers are subject to security protection at 76, 96 and 100 so as to insure that all transfer of data and inquiries are of a strictly confidential nature between the subscriber and the system shown generally at 71.

Each browser-based subscriber 72 will input to the database server 90 by accessing their subscriber area previously described with respect to FIG. 1 through the home page 78. Log-in and password security will exist at both the subscriber's access to the ISP at 76 and the subscriber's point of entry into its particular subscriber area at 82.

Once into the particular browser-based subscriber area 80 within the system 71, each browser-based subscriber 72 will have access to one of several customized forms that they will complete electronically at their work station and transfer to the database server 90. Form development and customization will be done within the system 71 at internal work stations 106 by employees of the system. These work stations 106 will be connected through a hub 108, all output therefrom being subject to business rules and logic at 110 before new or custom data forms and query forms are entered into the database server 90. The business logic rules will be a part of the new and customized forms as well as within the database server 90 itself. The effective output for browser-based subscribers 72 will be through forms processing resulting in a billing output from 104. Forms which enter a query into the database server 90 will be output back to the browser-based subscriber terminal 72. These reports may be printed by the browser-based subscriber if desired.

Each direct access subscriber 92 will also input and output from the system 71 via an ISP 94. Security at 96 would be in the form of a log-in password as well as at security point 100. Input from all direct access subscribers 92 must qualify by meeting the business logic and rules requirements of the system 71 at 102 from the Citrix® server 98. Output from the system 71 may be transferred through the Citrix® server 98 back to the direct access subscriber 92 or be in the form of a billing output from 104.

Figure 4:
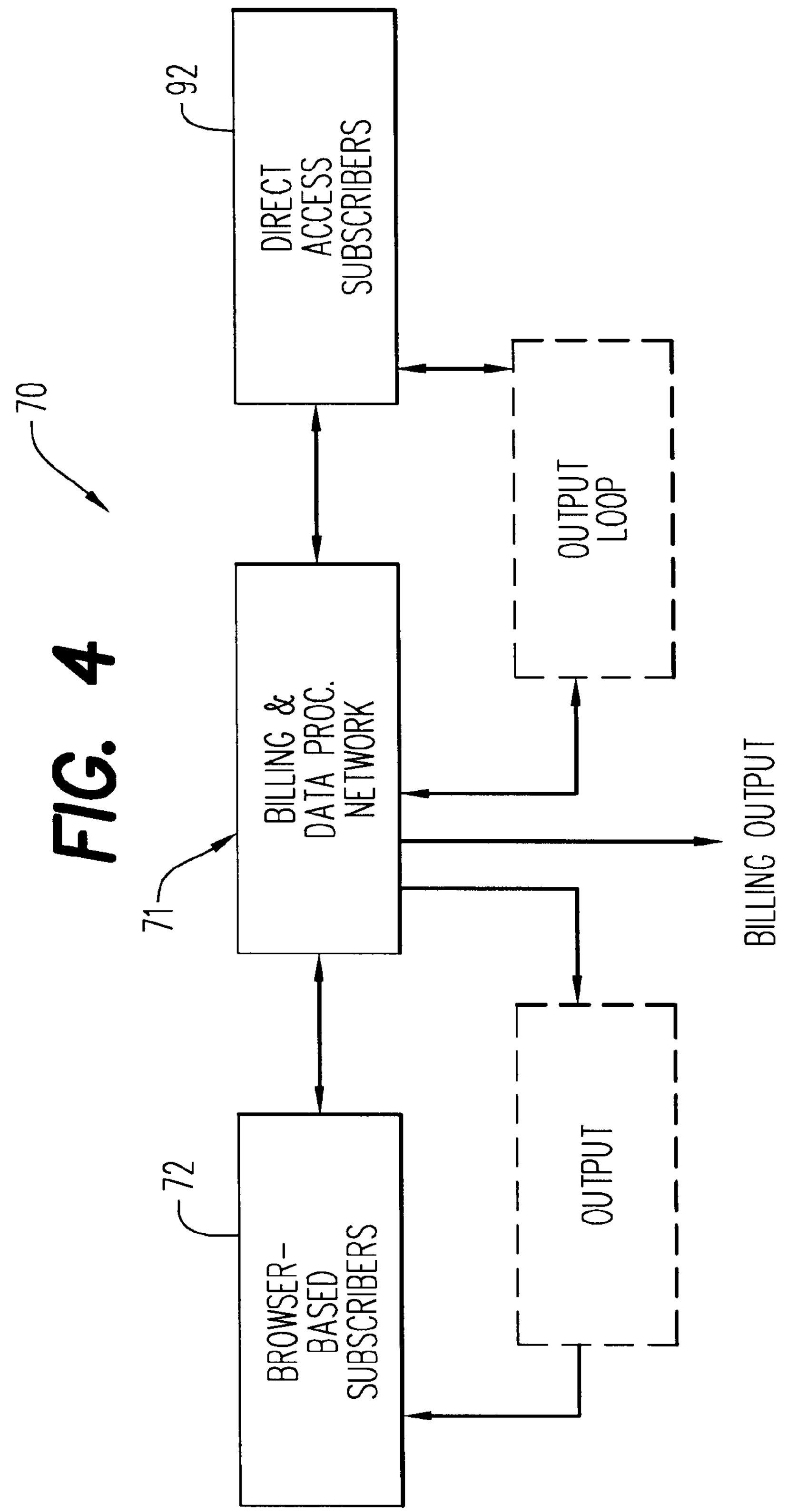
FIG. 4 is a block diagram of the preferred embodiment shown in FIG. 3.

A block diagram of the basic system elements 70 of FIG. 3 is shown in FIG. 4. Again, the system 71 receives input and delivers output to both browser-based subscribers 72 and direct access subscribers 92 with the option for each of the system 71 delivering billing output to clients of each.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An integrated internet facilitated billing, data processing, and communication system comprising:

a database server and a home page of a website which provides access via an internet service provider (ISP) to said database server by a plurality of browser-based subscribers each of which have electronic access to said home page via a modem and the ISP;

said home page providing only secure access by each browser-based subscriber to one of a plurality of subscriber areas within said system;

means for providing electronic transfer of substantially only billing and data entry forms to the browser-based subscriber upon request, data entered on said forms, when electronically returned to a corresponding said subscriber area, then entered into said database server, said database server then, utilizing an appropriate application software thereon, producing billing invoices and statements to clients and customers for each corresponding browser-based subscriber;

means for providing real time electronic viewing and query access of data and billings stored in said database server by each corresponding browser-based subscriber;

a PC type computer electronically connected to said database server for controlling said forms as required and responding to queries entered by each browser-based subscriber.

2. An integrated internet facilitated billing, data processing, and communication system as set forth in claim 1, further comprising:

means for subjecting all data transfer into said database server from browser-based subscribers and said PC-type computer to business logic and rules restrictions within said system.

3. An integrated internet facilitated billing, data processing, and communication system as set forth in claim 1, wherein:

said database server includes open database compliant software (ODBC) for seamless integration with other software applications.

4. An integrated internet facilitated billing, data processing, and communication system as set forth in claim 3, further comprising:

a direct access server electronically interconnected between said database server, data transfer therebetween subject to a business logic and rules restriction, and a plurality of direct access subscribers each of which gain secure access via thin client technology into said direct access server and applications contained on a database server via a modem and ISP;

said thin client access providing electronic transfer of billing and data entry to each subscriber secure data set and from the database server to each direct access subscriber upon request;

said thin client access also providing real time electronic viewing and query access regarding data and billings stored in said database server by each corresponding direct access subscriber;

a PC type computer electronically connected to said database server for responding to queries entered by each direct access subscriber.

5. An integrated internet facilitated billing, data processing, and communication system as set forth in claim 4, further comprising:

a home page of a website which provides thin client access via an internet service provider (ISP) to said database server by a plurality of subscribers each of which have electronic access to said home page via a modem and the ISP;

said home page providing only secure access by each direct access subscriber to one of a plurality of subscriber areas within said system;

said database server including an open database compliant software for seamless integration with other software applications.

6. An integrated internet facilitated billing, data processing, and communication system comprising:

a database server and a direct access server electronically interconnected between said database server and a plurality of direct access subscribers each of which gain secure thin client access into said direct access server via a modem and an internet service provider (ISP);

said thin client access providing electronic transfer of billing and information to each direct access subscriber upon request, then entered into said database server, said database server then, utilizing an appropriate application software thereon, producing billing invoices and statements to clients and customers of each corresponding direct access subscriber;

said thin client access also providing real time electronic viewing and query access regarding data and billings stored in said database server by each corresponding direct access subscriber;

a home page of a website which provides access via an internet service provider (ISP) to said database server by a plurality of subscribers each of which have electronic access to said home page via a modem and an ISP;

said home page providing secure access by each subscriber to one of a plurality of subscriber areas within said system;

said database server including open database compliant software (ODBC) for seamless integration with other software applications;

said ODBC also providing electronic transfer of substantially only billing and data upon request, data entered on said forms, when electronically returned to a corresponding said subscriber area, then entered into said database server, said database server then, utilizing an appropriate application software thereon, producing billing invoices and statements to clients and customers of each corresponding subscriber;

said ODBC also providing real time electronic viewing and query access regarding data and billings stored in said database server by each corresponding browser-based subscriber;

a PC type computer electronically connected to said database server for producing said forms as required and responding to queries entered by each direct access and browser-based subscriber.

7. An internet based computer system for billing, data processing and communication for and between subscribers and said system, one type of subscriber being of the browser-based type and another type of subscriber being of the direct access type, said system comprising:

database server means responsive to remote terminal commands from the browser-based subscriber requesting query and data input forms of a software application stored on said database server means, said input forms transmitted via an internet service provider (ISP) to a terminal screen of a terminal of the browser-based subscriber;

said database server means also responsive to receiving completed query and data input forms via an ISP from the browser-based subscriber by processing the completed data input forms on the software application and providing an output either back to the browser-based subscriber or to a client or customer of the browser-based subscriber, or both, in the form of a billing invoice or statement;

direct access server means operably connected to said database server via thin client technology means and responsive to remote terminal commands from the direct access subscriber via an ISP, query and or data entry entered directly into a particular software application stored on said database server means as facilitated by ISP transfer of only a screen picture of the software application to the direct access subscriber and providing another output either back to the direct access subscriber or to a customer or client of the direct access subscriber, or both, in the form of a billing invoice or statement.

* * * * *